(12) United States Patent
Sakumoto

(10) Patent No.: US 10,774,707 B2
(45) Date of Patent: Sep. 15, 2020

(54) NOX SENSOR PURIFICATION PROGRAM, INTERNAL COMBUSTION ENGINE, AND NOX SENSOR PURIFICATION METHOD

(71) Applicant: ISUZU MOTORS LIMITED, Tokyo (JP)

(72) Inventor: Kouji Sakumoto, Yokohama (JP)

(73) Assignee: ISUZU MOTORS LIMITED, Tokyo (JP)

(*) Notice: Subject to any disclaimer, the term of this patent is extended or adjusted under 35 U.S.C. 154(b) by 474 days.

(21) Appl. No.: 15/531,396

(22) PCT Filed: Nov. 6, 2015

(86) PCT No.: PCT/JP2015/081326
§ 371 (c)(1),
(2) Date: May 26, 2017

(87) PCT Pub. No.: WO2016/084584
PCT Pub. Date: Jun. 2, 2016

(65) Prior Publication Data
US 2017/0342881 A1 Nov. 30, 2017

(30) Foreign Application Priority Data
Nov. 27, 2014 (JP) .................................. 2014-240493

(51) Int. Cl.
*F01N 3/00* (2006.01)
*F01N 9/00* (2006.01)
(Continued)

(52) U.S. Cl.
CPC ................. *F01N 3/00* (2013.01); *F01N 9/00* (2013.01); *F02D 41/222* (2013.01); *F02D 45/00* (2013.01);
(Continued)

(58) Field of Classification Search
CPC ........... F01N 2560/026; F01N 2560/20; F01N 2900/102; F01N 2900/16; F01N 3/00;
(Continued)

(56) References Cited

U.S. PATENT DOCUMENTS 5,494,557 A 2/1996 Hotzel et al.
2010/0243445 A1 9/2010 Shindo et al.
(Continued)

FOREIGN PATENT DOCUMENTS

| JP | 2000-180400 A | 6/2000 |
| JP | 2009-074884 A | 4/2009 |

(Continued)

OTHER PUBLICATIONS

Extended European Search Report for EP App No. 15863879.1 dated Jul. 9, 2018, 7 pgs.
International Search Report and Written Opinion for PCT App No. PCT/JP2015/081326 dated Jan. 19, 2016, 9 pgs.

*Primary Examiner* — Phutthiwat Wongwian
*Assistant Examiner* — Diem T Tran
(74) *Attorney, Agent, or Firm* — Procopio, Cory, Hargreaves & Savitch LLP

(57) ABSTRACT

A non-transitory computer-readable medium having a NOx sensor purification instructions for a NOx sensor causes: an on-vehicle electronic computer mounted in the vehicle, when it comes to a predetermined purification time, to execute a start procedure to send a start command to perform a purification control to the control unit; and control unit, in response to the start command, to execute a purification procedure to perform the purification control which causes the current flowing in the reference pump cell from the reference pump current to be a purification pump current, which is set to a current value larger than the reference pump current.

12 Claims, 8 Drawing Sheets

(51) Int. Cl.
*F02D 41/22* (2006.01)
*F02D 45/00* (2006.01)
*G01N 27/416* (2006.01)

(52) U.S. Cl.
CPC ...... *G01N 27/416* (2013.01); *F01N 2560/026* (2013.01); *F01N 2560/20* (2013.01); *F01N 2900/102* (2013.01); *F01N 2900/16* (2013.01); *Y02T 10/40* (2013.01); *Y02T 10/47* (2013.01)

(58) Field of Classification Search
CPC .......... F01N 9/00; F02D 41/222; F02D 45/00; G01N 27/416; Y02T 10/40; Y02T 10/47
See application file for complete search history.

(56) References Cited

U.S. PATENT DOCUMENTS

| | | |
|---|---|---|
| 2011/0314898 A1 | 12/2011 | Liemersdorf et al. |
| 2013/0092537 A1* | 4/2013 | Mizutani .............. G01N 27/419 204/427 |
| 2014/0202135 A1 | 7/2014 | Sumilla et al. |
| 2015/0276659 A1 | 10/2015 | Sekiya et al. |

FOREIGN PATENT DOCUMENTS

| | | |
|---|---|---|
| JP | 2009-288082 A | 12/2009 |
| JP | 2010-237044 A | 10/2010 |
| JP | 2015-200643 A | 11/2015 |

\* cited by examiner

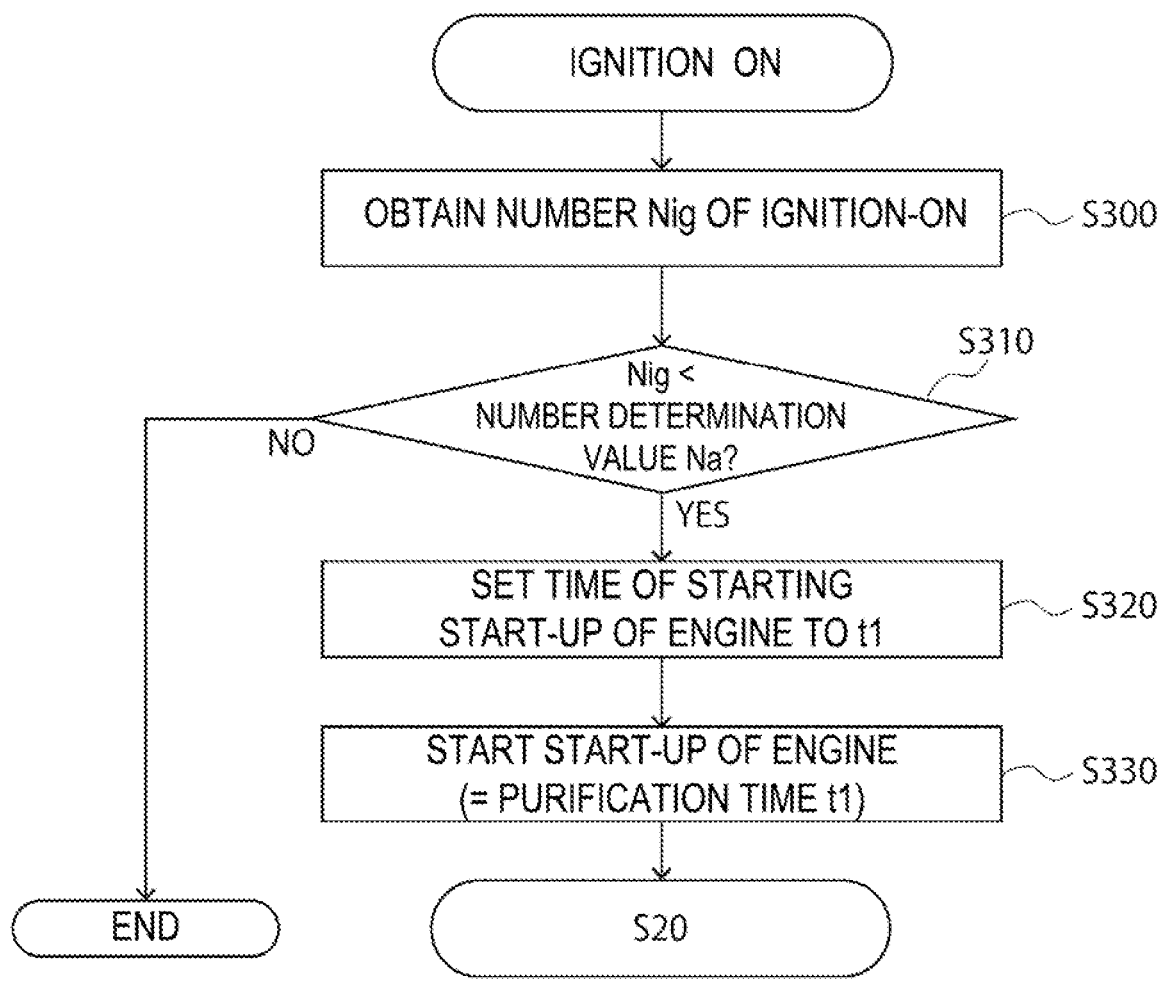

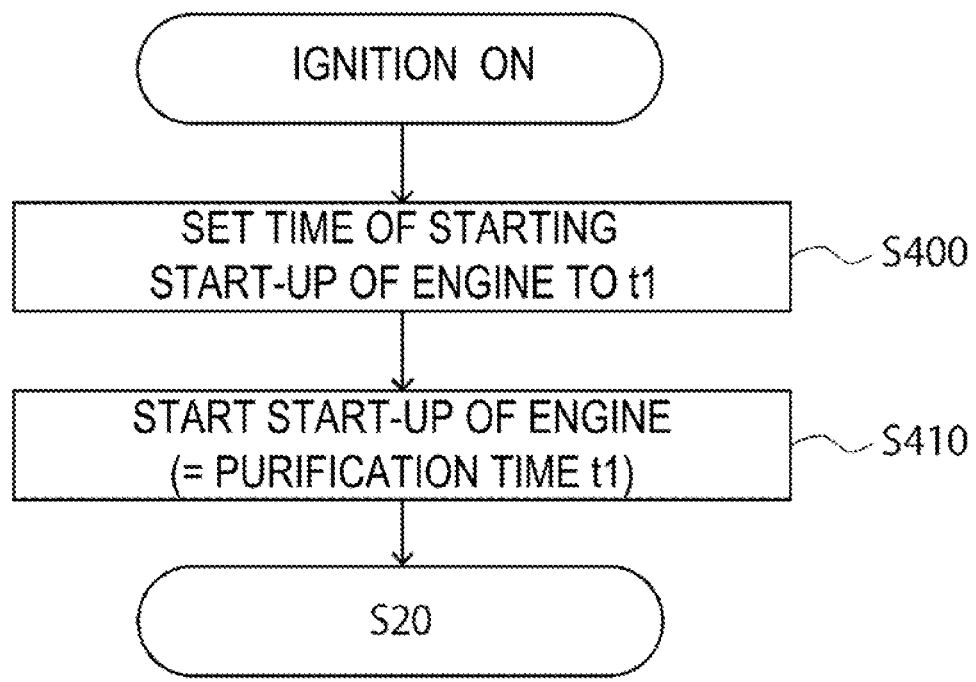
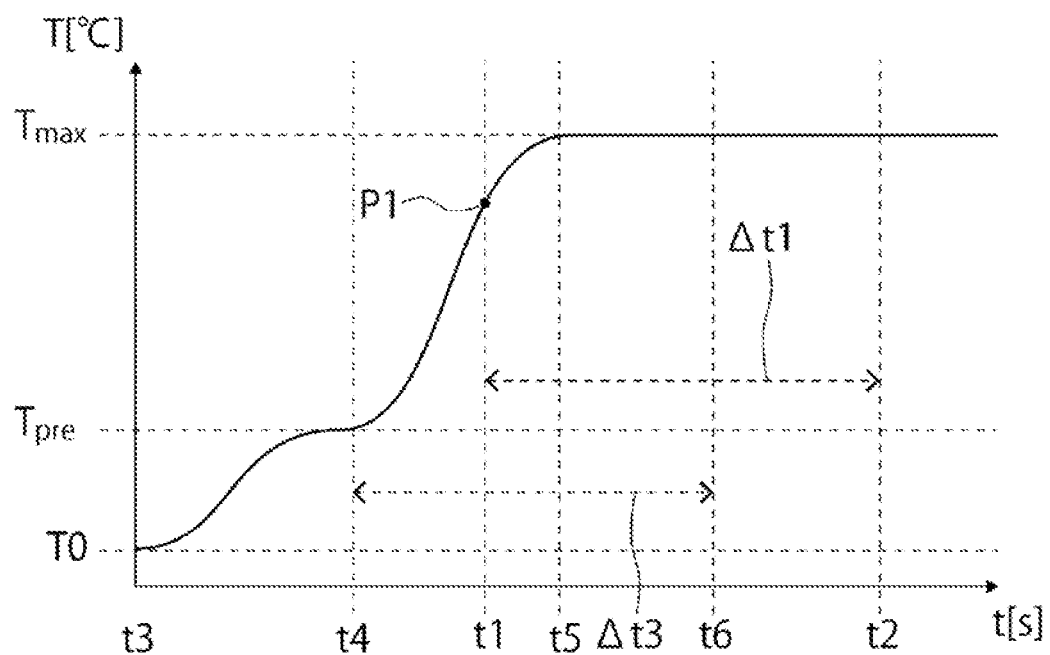

NOX SENSOR PURIFICATION PROGRAM, INTERNAL COMBUSTION ENGINE, AND NOX SENSOR PURIFICATION METHOD

CROSS-REFERENCE TO RELATED APPLICATIONS

This application is a U.S. National Stage entry of PCT Application No. PCT/JP2015/081326, filed on Nov. 6, 2015, which claims priority to Japanese Patent Application No. 2014-240493, filed Nov. 27, 2014, the contents of which are incorporated herein by reference.

TECHNICAL

The present invention relates to a NOx sensor purification program, an internal combustion engine, and a NOx sensor purification method, and specifically to a NOx sensor purification program, an internal combustion engine, and a NOx sensor purification method, in which a robustness or a reliability with respect to a disturbance is improved without loss of a durability of a NOx sensor.

BACKGROUND ART

In order to purify a NOx (nitrogen oxide) in an exhaust gas, a diesel engine detects a NOx concentration in the exhaust gas by using a NOx sensor disposed at an exhaust passage, and adjusts the injection amount of urea water and diagnoses a catalyst and the like by itself based on the detection value.

In principle, the NOx sensor has a reference air chamber where a certain reference oxygen concentration is maintained, and a reference electrode disposed in the reference air chamber, in the sensor element configured by an oxygen ion-conductive solid electrolyte layer such as zirconia. Further, a reference pump cell is configured to maintain an oxygen concentration inside the reference air chamber to the reference oxygen concentration from the reference electrode and a pump electrode disposed outside the sensor element.

In the NOx sensor, in a case where the oxygen concentration of the reference air chamber cannot be maintained at the reference oxygen concentration due to the disturbance and the like, by the operation becomes failure and the NOx concentration which the NOx sensor measures becomes improper. Incidentally, the disturbance herein can be exemplified by the change of the oxygen concentration of the reference air chamber, the entry of moisture or hydrocarbon into the reference air chamber, and the like.

However, when a reference pump current flowing in the reference electrode increases in order to improve a tolerance against the disturbance, the deterioration of the reference electrode is promoted, and the control failure of the NOx sensor occurs. In addition, the oxygen of the reference air chamber goes around the heater to promote the deterioration of the heater, and thus the sensor element is not sufficiently heated.

With regard thereto, for example, as described in JP-A 2009-288082 (Patent Literature 1), there is proposed a method of controlling increase and decrease of the pump current of the sensor. In the control, in a case where the pump current is changed based on the constituent of the exhaust gas calculated from the operation state of the engine and then constituents such as hydrocarbon are increased, the pump current is increased to secure the reliability of the NOx sensor.

However, the above-described control does not correspond to a case where the moisture is condensed in the reference air chamber after a long-term storage of the vehicle, a case where the heater of the NOx sensor is heated, or the like. Thus, the NOx sensor is not maintained in a proper state in the long term.

Even if the oxygen concentration of the reference air chamber is maintained at the reference oxygen concentration, the constituent of the exhaust gas may cause the increase of the reference pump current, thereby progressing the deterioration of the reference electrode or the deterioration of the heater.

CITATION LIST

Patent Literature

Patent Literature 1: JP-A-2009-288082

SUMMARY

Technical Problem

The invention has been made in view of the above-described problems and an object thereof is to provide a NOx sensor purification program, an internal combustion engine, and a NOx sensor purification method in which a robustness or a reliability with respect to a disturbance is improved without loss of a durability of a NOx sensor.

Solution to Problem

In a purification program of a NOx sensor of the present invention for resolving the above-described problem, a NOx sensor purification program for a NOx sensor, which that is disposed at an exhaust passage of an internal combustion engine mounted in a vehicle, and in which configured with a reference pump cell pumping out oxygen into a reference air chamber is configured by a reference electrode which is disposed inside a sensor element in the reference air chamber communicating with outer air and a reference pump electrode disposed outside the sensor element, and which is provided with a control unit which performs control to adjust a current flowing in the reference pump cell to be a predetermined reference pump current, the NOx sensor purification program causing: an on-vehicle electronic computer mounted in the vehicle, when it comes to a predetermined purification time, to execute a start procedure to send a start command to perform a purification control to the control unit; and the control unit, in response to the start command, to execute a purification procedure to perform the purification control which causes the current flowing in the reference pump cell from the reference pump current to be a purification pump current, which is set to a current value larger than the reference pump current.

In the present invention for resolving the above-described problem, an internal combustion engine includes an on-vehicle electronic computer in which the above-described NOx sensor purification program is stored In the present invention for resolving the above-described problem, a purification method of a NOx sensor adjusts a current flowing in a reference pump cell, which is configured by a reference electrode disposed in a reference air chamber communicating the outer air inside a sensor element and a pump electrode disposed on an outside of the sensor element, to be a predetermined reference pump current and maintains an oxygen concentration of the reference air chamber to a predetermined reference oxygen concentration. When it comes to a predetermined purification time, the current flowing in the reference pump cell is set to a purification pump current, which is set to the current value larger than the reference pump current, and an oxygen concentration of the reference air chamber is set to a purification oxygen concentration, which is set to a concentration larger than the reference oxygen concentration.

Advantageous Effects of Invention

According to the NOx sensor purification program, the internal combustion engine, and the NOx sensor purification method of the present invention, when it comes to a predetermined purification time, the current flowing in the reference pump cell is set to a purification pump current higher than the reference pump current, and thus, in a normal use, the reference pump current is lowered to improve the durability of the NOx sensor. The purification pump current flows to purify the reference pump cell and the reference air chamber, and maintain the NOx sensor in an excellent state.

Accordingly, a robustness or a reliability with respect to a disturbance is improved without loss of a durability of a NOx sensor.

BRIEF DESCRIPTION OF DRAWINGS

FIG. 7 is a flowchart in which a fourth purification time in the purification program of FIG. 3 is set.

FIG. 8 is a flowchart in which a fifth purification time in the purification program of FIG. 3 is set.

FIG. 9 is a graph illustrating a relation between a heating time of a heater of the NOx sensor of FIG. 1 and a temperature of a sensor element.

DESCRIPTION OF EMBODIMENTS

Figure 1:
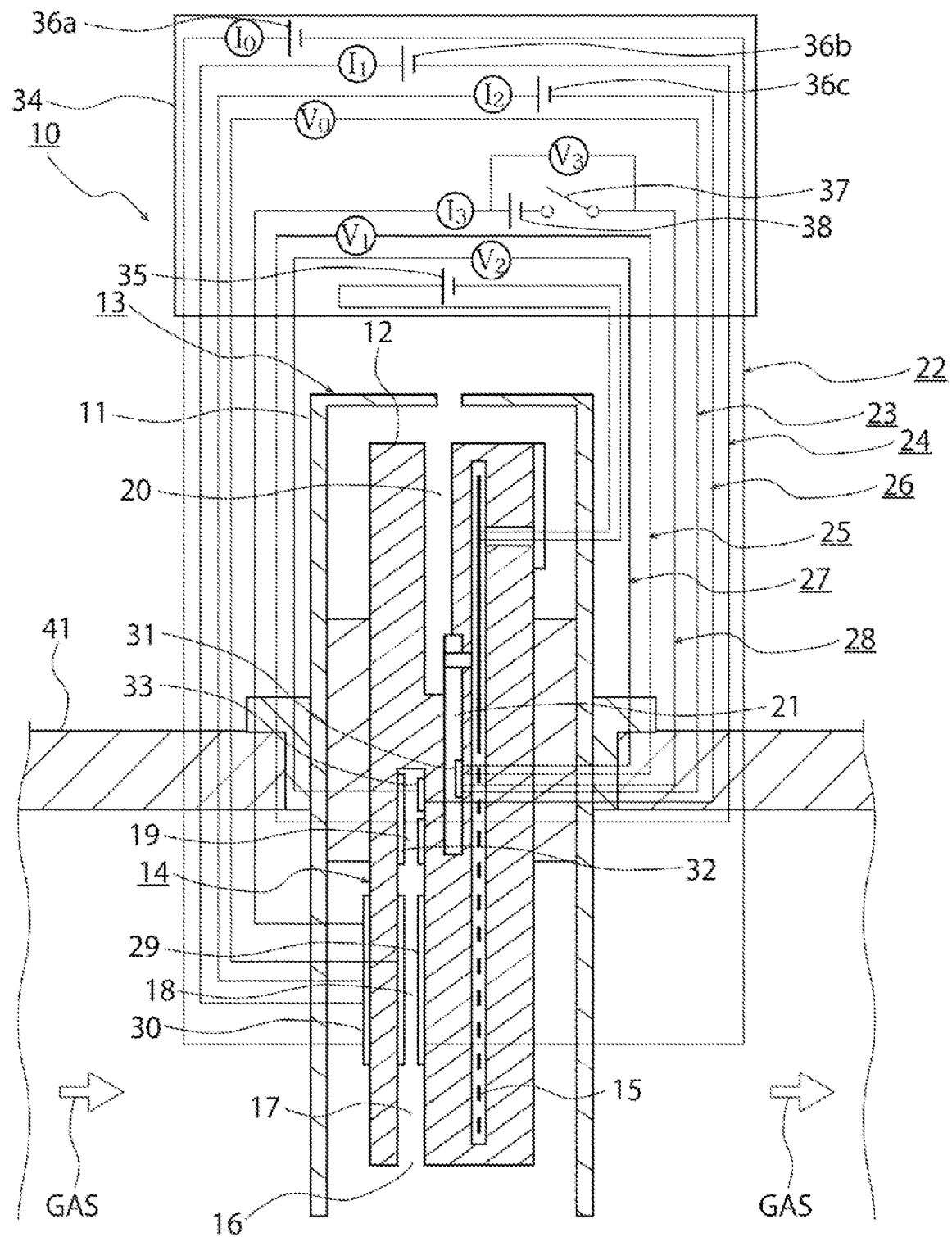
FIG. 1 is an explanation view illustrating an example of a NOx sensor which an inspection device of the present invention inspects.
Figure 2:
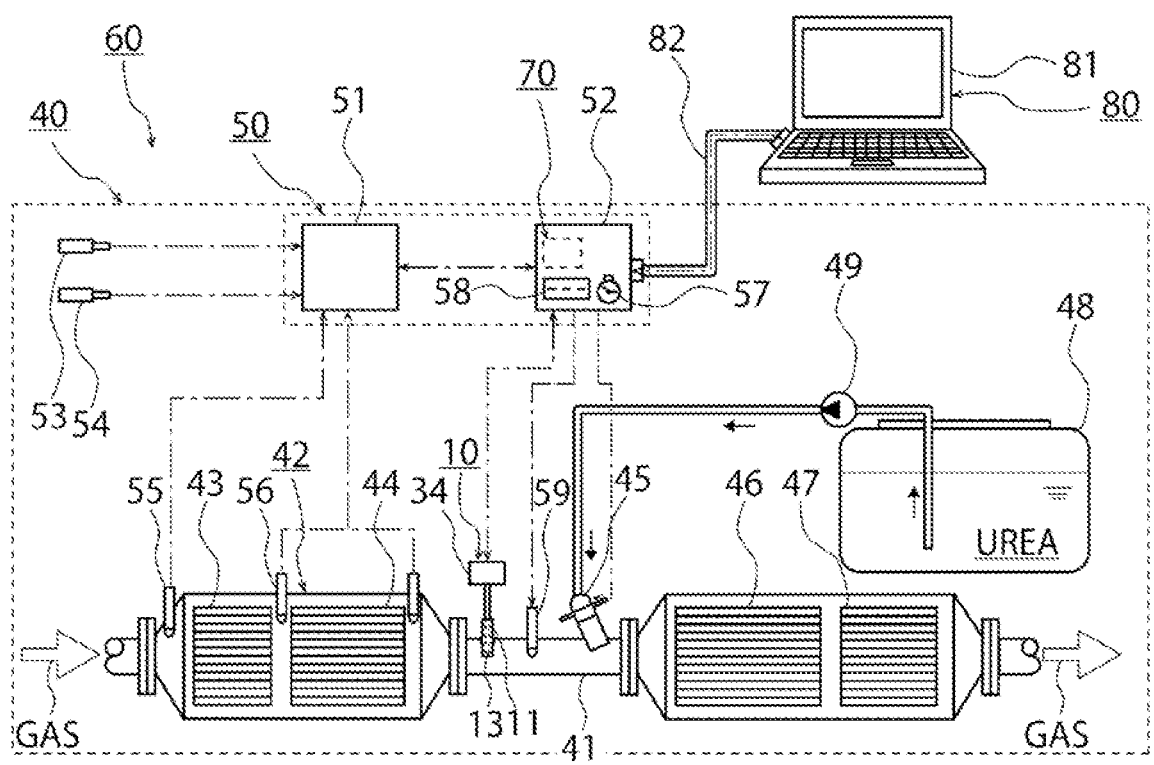
FIG. 2 is an explanation view illustrating an embodiment of an internal combustion engine of the present invention.

Hereinafter, the description will be given about a NOx sensor purification program, an internal combustion engine, and a NOx sensor purification method of the present invention. FIG. 1 illustrates an example of a configuration of a NOx sensor 10. FIG. 2 illustrates an example of a configuration of an engine 40 in which a urea water control device (hereinafter, DCU) 52 is provided as an on-vehicle electronic computer storing a purification program 70 of an embodiment of the present invention. The purification program 70 of the NOx sensor 10 is a program which excludes an effect of a disturbance from an oxygen concentration of a reference air chamber 21 of the NOx sensor 10. Incidentally, the disturbance can be exemplified by a change of an oxygen concentration of the reference air chamber 21, an entry of moisture and hydrocarbon into the reference air chamber 21, and the like.

As illustrated in FIG. 1, in the NOx sensor 10, a sensor body 13 which is configured by an oxygen ion-conductive solid electrolyte body 12 such as zirconia ($ZrO_2$) is disposed inside a housing 11. The sensor body 13 includes a sensor element 14 and a heater 15 disposed adjacent to the sensor element 14.

In the exhaust passage 41 of the solid electrolyte body 12, an introduction chamber 17, an adjustment chamber 18, and a measurement chamber 19 are disposed in order backward from an introduction opening 16 of the exhaust gas in the sensor element 14, and the introduction opening 16 to the measurement chamber 19 communicate with each other. In addition, an outer air introduction path 20 which introduces outer air is disposed outside the exhaust passage 41 of the solid electrolyte body 12. Additionally, the reference air chamber 21 which communicates with the outer air introduction path 20 is disposed in the solid electrolyte body 12.

The sensor element 14 is provided with a first pump cell 22, a first oxygen-partial-pressure detection cell 23, a second pump cell 24, a second oxygen-partial-pressure detection cell 25, a measurement pump cell 26, a third oxygen-partial-pressure detection cell 27, and a reference pump cell 28.

The first pump cell 22 is configured by a first pump electrode 29 disposed inside the adjustment chamber 18, a second pump electrode 30 disposed outside the sensor element 14, and a solid electrolyte body 12 held between the first pump electrode 29 and the second pump electrode 30. The first oxygen-partial-pressure detection cell 23 is configured by the first pump electrode 29, a reference electrode 31 disposed inside the reference air chamber 21, and the solid electrolyte body 12 held between the first pump electrode 29 and the reference electrode 31. The second pump cell 24 is configured by the second pump electrode 30, the third pump electrode 32 disposed inside the measurement chamber 19, and the solid electrolyte body 12 held between the second pump electrode 30 and the third pump electrode 32. The second oxygen-partial-pressure detection cell 25 is configured by the reference electrode 31, the third pump electrode 32, and the solid electrolyte body 12 held between the reference electrode 31 and the third pump electrode 32. The measurement pump cell 26 is configured by the second pump electrode 30, a measurement electrode 33 disposed inside the measurement chamber 19, and the solid electrolyte body 12 held between the second pump electrode 30 and the measurement electrode 33. The third oxygen-partial-pressure detection cell 27 is configured by the reference electrode 31, the measurement electrode 33, and the solid electrolyte body 12 held between the reference electrode 31 and the measurement electrode 33. The reference pump cell 28 is configured by the second pump electrode 30, the reference electrode 31, and the solid electrolyte body 12 held between the second pump electrode 30 and the reference electrode 31.

The NOx sensor 10 includes, in the control unit 34, a heater power source 35 which supplies power to the heater 15, a first power source 36a which supplies power to the first pump cell 22, a second power source 36b which supplies power to the second pump cell 24, a third power source 36c which supplies power to the measurement pump cell 26, a switch 37 which switches between the conduction of the reference pump current I3 of the reference pump cell 28 and a measurement operation of a cell electromotive force V3, and a reference power source 38 which supplies power to the reference pump cell 28.

In the NOx sensor 10, when the concentration of the nitrogen oxide in the exhaust gas is detected, first, power is supplied to the heater 15 from the heater power source 35 to heat the sensor element 14. Accordingly, when the temperature of the sensor element 14 is raised to a predetermined measurement temperature Tmax, the conductivity of the oxygen ion of the solid electrolyte body 12 is improved.

When the temperature of the sensor element 14 is raised to the measurement temperature Tmax, the switch 37 is switched into an on state so that a predetermined reference pump current I3 flows in the reference pump cell 28, the oxygen concentration of the reference air chamber 21 is maintained at a preset reference oxygen concentration $\rho 0$, and the reference air chamber 21 in the reference electrode 31 is purified.

Next, the switch 37 is switched into an off state so that the cell electromotive force V3 is detected by the reference pump cell 28. The cell electromotive force V3 indicates an oxygen partial pressure between the reference air chamber 21 and the exhaust passage 41.

Next, a second power source 36b is controlled based on the electromotive force V1 detected by the second oxygen-partial-pressure detection cell 25. Accordingly, the second pump current I1 in the second pump cell 24 is controlled, and the second pump cell 24 performs an operation of pumping oxygen of the measurement chamber 19. Accordingly, an oxygen partial pressure in the atmosphere in the measurement chamber 19 is controlled to a low oxygen partial pressure value, at which there occurs substantially no effect in measuring NOx.

The second pump current I1 of the second pump cell 24 is input to the first oxygen-partial-pressure detection cell 23 as a control signal, and the electromotive force V0 thereof is controlled such that a gradient of the oxygen partial pressure in the atmosphere in the measurement chamber 19 is usually constant.

Next, the third power source 36c is controlled such that the electromotive force V2 in the third oxygen-partial-pressure detection cell 27 is constant. Accordingly, the measurement pump cell 26 performs an operation of pumping oxygen, in which NOx is reduced or resolved around the measurement electrode 33 in the measurement chamber 19. An amount of the oxygen which generates around the measurement electrode 33 is proportional to the concentration of NOx in the measured gas. Therefore, the pump current I2 in the measurement pump cell 26 is detected, so that the concentration of NOx in the exhaust gas is calculated.

Next, the description will be given about the engine 40 in which the NOx sensor 10 is disposed in the exhaust passage 41. In the engine 40, the exhaust gas discharged from a cylinder (not illustrated) is purified by a post treatment device 42 disposed in the exhaust passage 41, and is released to the atmosphere.

In the post treatment device 42, an oxidation catalyst 43, a collection device 44, a urea water injection valve 45, a SCR catalyst 46, and an ammonia slip catalyst 47 are disposed in order from the upper stream of the exhaust passage 41. When the exhaust gas passes through the post treatment device 42, in the oxidation catalyst 43, unburned hydrocarbon and carbon monoxide in the exhaust gas are oxidized, and the nitrogen monoxide is oxidized, whereby nitrogen dioxide is generated. Next, in the collection device 44, the nitrogen monoxide is oxidized by the supported catalyst to generate nitrogen dioxide, and particulate substances in the exhaust gas are collected. Further, in the collection device 44, the collected particulate substances and nitrogen dioxide react with each other to oxidize and remove the particulate substances. Next, in the SCR catalyst 46, the nitrogen oxide in the exhaust gas in which the temperature is raised by the oxidation reaction between the oxidation catalyst 43 and the collection device 44 is reduced by each of SCR reactions which use, as a reducing agent, ammonia generated by the hydrolysis of urea water injected from the urea water injection valve 45.

The urea water injected from the urea water injection valve 45 is stored in a urea water tank 48. The urea water stored in the urea water tank 48 is force-fed by a force-feed pump 49 and is carried to the urea water injection valve 45 through a piping.

The engine 40 includes a control unit 50 as a unit of the on-vehicle electronic computer which controls the engine 40. The control unit 50 includes an engine control device (hereinafter, ECM) 51 which controls an injection amount of fuel or a DCU 52 which controls the injection of urea water in the post treatment device 42. The ECM 51 is connected with an ignition-on sensor 53, a vehicle speed sensor 54, an exhaust temperature sensor 55, and a differential pressure sensor 56. Further, a soak timer 57 obtaining a soak time which is a stop time of the vehicle and a counter 58 counting the number of the ignition-on are provided in the DCU 52, and the DCU 52 is connected with the NOx sensor 10 and an exhaust gas temperature sensor 59. Incidentally, the sensors and the like are merely examples, and the invention is not limited to the configuration.

The engine 40 is mounted in the vehicle 60. Further, a service station which performs inspection of maintenance on the vehicle 60 is provided with an inspection device 80. The inspection device 80 includes a vehicle exterior electronic calculator 81, and a communicator 82 which connects the vehicle exterior electronic calculator 81 and the DCU 52.

The vehicle exterior electronic calculator 81 is configured by a computer that is connected with the DCU 52 through the communicator 82 and can transmit and receive data between the DCU, and includes a CPU, a memory, a storage medium, an input device, and an output device. The communicator 82 can be exemplified by an optical cable, a coaxial cable, a TP cable, a serial cable, and a parallel cable.

In such an engine 40, the purification program 70 is stored in the storage medium of the DCU 52 provided as an on-vehicle electronic computer. The purification program 70 is configured to execute a purification control at a predetermined purification time t1.

Figure 3:
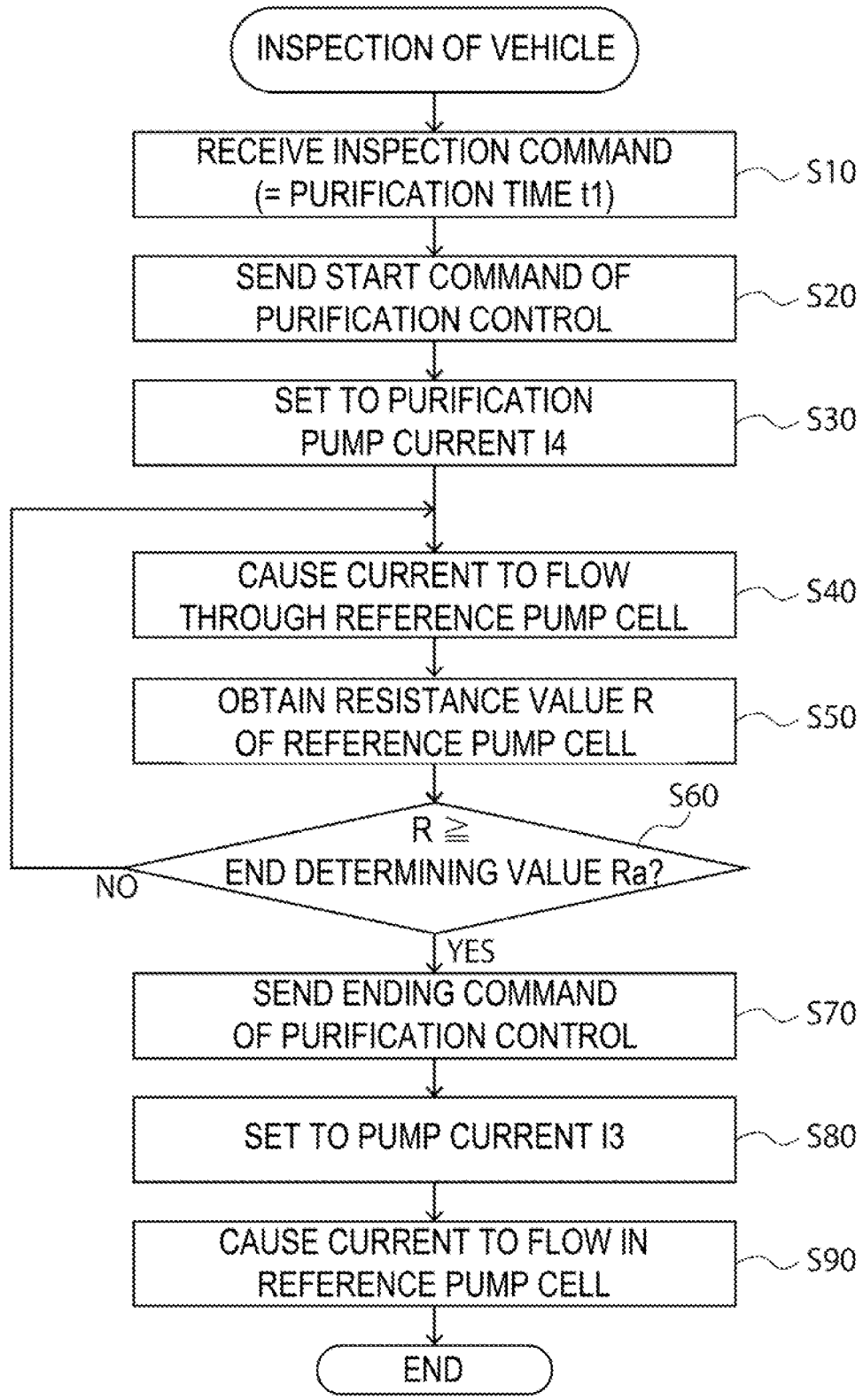
FIG. 3 is a flowchart illustrating an embodiment of a NOx sensor purification program of the present invention which is stored in an on-vehicle electronic computer in FIG. 2, and illustrates a first purification time.

As illustrated in FIG. 3, in step S10, at the purification time t1, the purification program 70 instructs the DCU 52 to execute step S20 as a start procedure. Next, the control unit 34 executes step S30 to step S40 as a purification procedure.

In other words, in the purification method of the NOx sensor 10 which is performed by executing the purification program 70, when it comes to a predetermined purification time t1, the current flowing in the reference pump cell 28 is set to a purification pump current I4, which is set to the current value larger than the reference pump current I3, and the oxygen concentration of the reference air chamber 21 is set to a purification oxygen concentration $\rho 1$ which is set to the concentration larger than the reference oxygen concentration $\rho 0$.

In other words, in a normal use, the reference pump current I3 is lowered to suppress the deterioration of the reference electrode 31. Further, the reference pump current I3 is lowered to prevent the deterioration of the heater 15 caused when the oxygen of the reference air chamber 21 goes around the heater. Accordingly, the durability of the NOx sensor 10 in a normal use is improved.

On the other hand, when it comes to the purification time t1, the current flowing in the reference pump cell 28 is set to the purification pump current I4 to oxidize and remove hydrocarbon, carbon monoxide, and water on the reference electrode 31. The oxygen concentration of the reference air chamber 21 is set to the purification oxygen concentration ρ1, and the oxygen is discharged from the reference air chamber 21 to the outer air introduction path 20, and hydrocarbon, carbon monoxide, and water are discharged from the reference air chamber 21. Accordingly, while excluding the effect of the disturbance, the reference air chamber 21 is purified to maintain the NOx sensor 10 in an excellent state.

As described above, according to the engine 40 provided with the above-described purification program 70 and the DCU 52 storing the purification program 70, and the purification method of the NOx sensor 10, the robustness or the reliability with respect to the disturbance is improved without loss of the durability of the NOx sensor 10.

Next, the detailed description will be given about the purification program 70.

The purification program 70 starts when it comes to the time t1. The first purification time t1 of the embodiment is a time when the vehicle 60 stops at the service station, and the vehicle 60 is inspected by the inspection device 80 provided in the service station. Specifically, the purification time t1 is a time when the vehicle 60 stops at the service station, the vehicle exterior electronic calculator 81 of the inspection device 80 is connected with the DCU 52 by the communicator 82, and step S10 is executed in which an inspection command sent from the vehicle exterior electronic calculator 81 is received in the DCU 52.

Next, when it comes to the purification time t1 in step S10, the DCU 52 executes step S20 in which a start command to cause the control unit 34 of the NOx sensor 10 to perform the purification control is sent to the control unit 34.

Next, if the control unit 34 receives the start command sent in step S20, when the switch 37 is turned on, the control unit 34 executes step S30 in which the current flowing in the reference pump cell 28 is set from the reference pump current I3 to the purification pump current I4. Next, the reference power source 38 is controlled so that the control unit 34 executes step S40 in which the purification pump current I4 is caused to flow through the reference pump cell 28.

Figure 4:
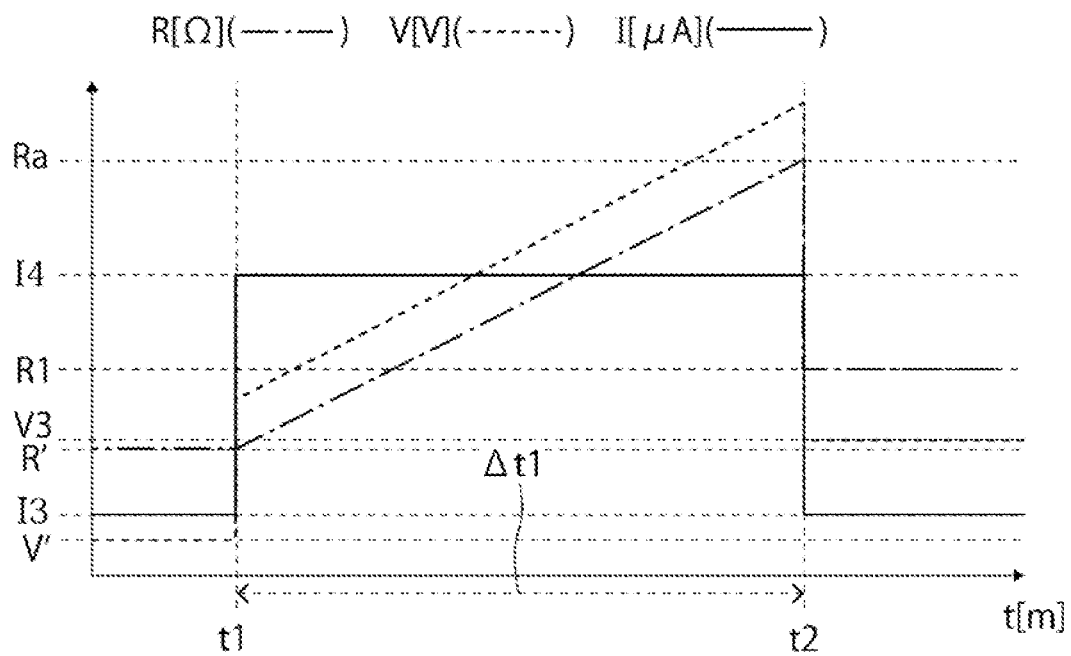
FIG. 4 is a graph illustrating a relation between a time elapse of the purification program of FIG. 3 and a resistance value, an electromotive force, and a current value of a reference pump cell.

As illustrated in FIG. 4, the purification pump current I4 is set to a value higher than the reference pump current I3, based on the oxygen partial pressure of the reference air chamber 21 and the exhaust passage 41, and the volume of the reference air chamber 21 and the magnitude of the reference electrode 31. The purification pump current I4 is a value such that the durability of the solid electrolyte body 12 configuring the sensor element 14 or the reference electrode 31 is not deteriorated in a short-term use for purification, and is a value such that the oxygen concentration of the reference air chamber 21 is set to the purification oxygen concentration ρ1, which is set to a concentration larger than the reference oxygen concentration ρ0. The oxygen partial pressure of the reference air chamber 21 and the exhaust passage 41 can be obtained from the cell electromotive force V3 of the reference pump cell 28 when the switch 37 is turned off. Further, the purification pump current I4 is made larger as the volume of the reference air chamber 21 is larger. For example, a value of the purification pump current I4 is two times to five times the value of the reference pump current I3.

Incidentally, when the current value flowing in the reference pump cell 28 is changed from the reference pump current I3 to the purification pump current I4, the oxygen partial pressure of the reference air chamber 21 and the exhaust passage 41 is changed. The cell electromotive force V3 is changed by the change of the oxygen partial pressure. However, in order to prevent that the respective oxygen partial pressures (electromotive forces V1 and V2) of the second oxygen-partial-pressure detection cell 25 and the third oxygen partial pressure cell 27 are changed according to the change of the cell electromotive force V3, it is desirable to change the current and the voltage of the cells 22 to 27.

Next, while step S40 is being executed by the control unit 34, the DCU 52 executes step S50 in which the resistance value R of the reference pump cell 28 is obtained through the control unit 34. Next, the DCU 52 executes step S60 to determine whether the resistance value R is a predetermined end determining value Ra or more.

In step S60, in a case where the resistance value R is smaller than the end determining value Ra, the procedure returns to step S30, and the conduction of the purification pump current I4 is continued. On the other hand, in step S60, in a case where the resistance value R is the end determining value Ra or more, the DCU 52 executes step S70 in which an ending command to stop the purification control is sent to the control unit 34.

The end determining value Ra is set as a value for determining whether the effect of the disturbance by the purification control in step S40 is excluded. In a case where the reference pump current I3 flows in the reference pump cell 28, it is preferable that the end determining value Ra is set based on the resistance value R1 in which the electromotive force V3 is the oxygen partial pressure of the reference air chamber 21 and the exhaust passage 41.

Next, if the control unit 34 receives the ending command sent in step S70, at a time when the switch 37 is turned on, the control unit 34 executes step S80 in which the current flowing, in the reference pump cell 28 is set from the purification pump current I4 to the reference pump current I3. Next, the reference power source 38 is controlled so that the control unit 34 executes step S90 in which the reference pump current I3 is caused to flow in the reference pump cell 28, and the program is ended.

FIG. 4 illustrates an example of a relation between an elapsed time and the resistance value R, the voltage value V, and the current value I of the reference pump cell 28. Herein, the time when step S90 starts is set to t2.

At the time of the arrival at the service station, the oxygen concentration of the reference air chamber 21 of the NOx sensor 10 cannot be maintained at the reference oxygen concentration ρ0 due to the disturbance. In other words, the voltage value V' at that time is smaller than the cell electromotive force V3 based on the oxygen partial pressure of the reference air chamber 21 and the exhaust passage 41, and thus, the resistance value R' is also small. When the inspection command sent from the vehicle exterior electronic calculator 81 is received by the DCU 52 and it comes to the purification time t1, the purification program 70 starts.

Next, when step S40 starts, the purification pump current I4 flows in the reference pump cell 28. Accordingly, the exclusion of the effect of the disturbance starts. An applied voltage V increases in correspondence to the current value I. On the other hand, since the exclusion of the effect of the disturbance proceeds and the electromotive force is generated according to the oxygen partial pressure, the applied voltage V is further increased. For this reason, the resistance value R of the reference pump cell 28 is also increased.

Next, when the resistance value R is the end determining value Ra or more, step S90 starts at time t2.

A period Δt1 between time t1 and time t2 is a period for which the control unit 34 executes the purification control. The period Δt1 is about ten minutes on average, but it may be several hours depending on the operation state of the vehicle 60.

In this manner, until the resistance value R of the reference pump cell 28 at a time when the current flowing in the reference pump cell 28 is the purification pump current I4 comes to the predetermined end determining value Ra or more, the effect caused by the disturbance is completely excluded by the purification of the NOx sensor 10, and the interior of the reference air chamber 21 is purified.

When the resistance value R of the reference pump cell 28 is the end determining value Ra or more, the purification control can be ended. Thus, a time for which the purification pump current I4 flows can be shortened, which is advantageous to the improvement of the durability of the NOx sensor 10.

Incidentally, instead of the determination procedure of step S60, the period Δt1 may be set in advance, and step S70 may be executed when the period Δt1 elapses. In this case, the period Δt1 for which the resistance value R of the reference pump cell 28 in which the flowing current is set to the purification pump current I4 is the predetermined end determining value Ra or more is obtained through an experiment or an examination in advance. When the obtained period Δt1 is used as above instead of step S60, the effect resulting from the disturbance may remain, but the inspection operation of the vehicle 60 is completed rapidly.

As described above, when the purification time t1 is set to the time of the inspection of the vehicle 60, the NOx sensor 10 can be purified regularly. Thus, it is advantageous in that the NOx sensor 10 is maintained in an excellent state for a long period.

In the above-described purification program 70, in the middle of the traveling of the vehicle 60, the DCU 52 can execute a time setting procedure in which the second purification time t1 is set to a time when a travel distance L1 of the vehicle 60 is a predetermined purification travel distance La or more.

According to the experiment or the examination in advance, the purification travel distance La is set to a travel distance necessary for the purification of the NOx sensor 10, in a case where the vehicle 60 is travelled. For example, the purification travel distance La is set to 5000 km to 30000 km.

In this case, the purification program 70 is usually executed during the travelling of the vehicle 60.

Figure 5:
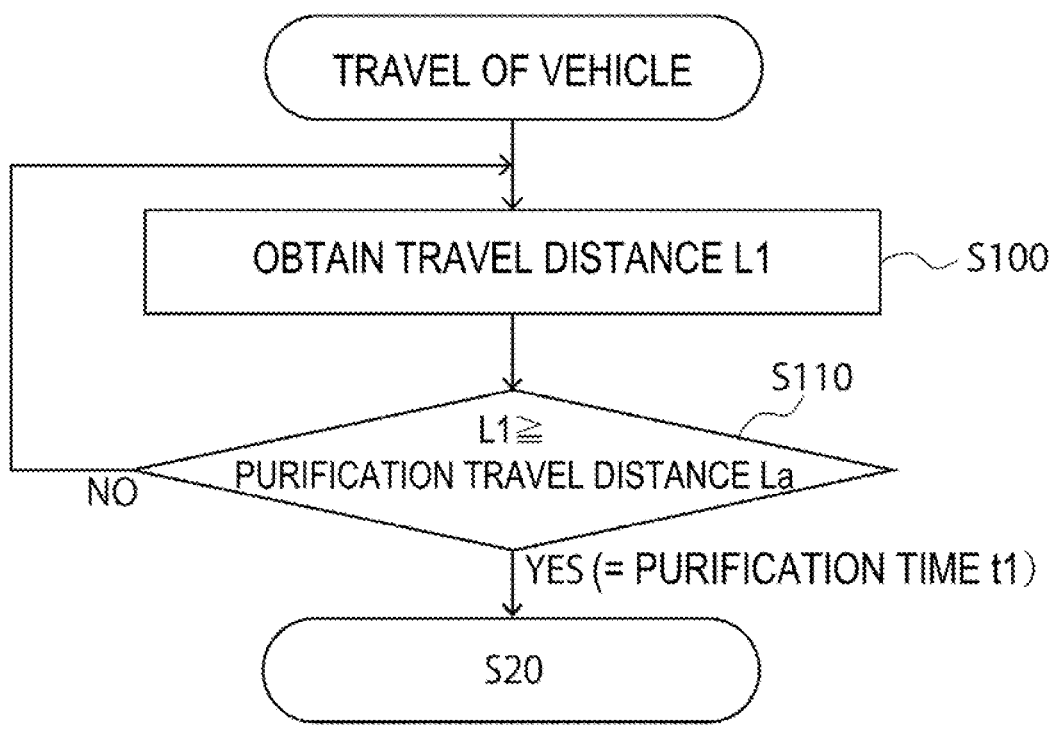
FIG. 5 is a flowchart in which a second purification time in the purification program of FIG. 3 is set.

As illustrated in FIG. 5, in the time setting procedure, the DCU 52 executes step S100 to access the ECM 51 and obtain the travel distance L1 of the vehicle 60 which the ECM 51 obtains from the detection value of the vehicle speed sensor 54.

Next, the DCU 52 executes step S110 to determine whether the obtained travel distance L1 is the purification travel distance La or more. In step S110, in a case where the travel distance L1 is shorter than purification travel distance La, the procedure returns to step S100. On the other hand, in a case where the travel distance L1 is the purification travel distance La or more, step S20 is executed with the determination time set as the purification time t1.

The purification time t1 is set to a time where the travel distance L1 is the purification travel distance La or more, so that the NOx sensor 10 is regularly purified based on the travel distance L1 of the vehicle 60. Thus, it is advantageous in that the NOx sensor 10 is maintained in an excellent state during a long period.

In the above-described purification program 70, it is possible to cause the DCU 52 to execute the time setting procedure in which the third purification time t1 is set to a time when the start-up of the engine 40 starts after a soak time Δt2 of the vehicle 60 comes to a predetermined long period Δta or more.

In a case where the vehicle 60 is stopped according to the experiment or the examination in advance, the long period Δta is set as a period necessary for the purification of the NOx sensor 10. For example, the long period Δta is set to seven days to one month.

In this case, the purification program 70 is executed at the time of the start-up of the vehicle 60. The time of the start-up of the vehicle 60 is set to a time when the ignition-on is detected by the ignition-on sensor 53.

Figure 6:
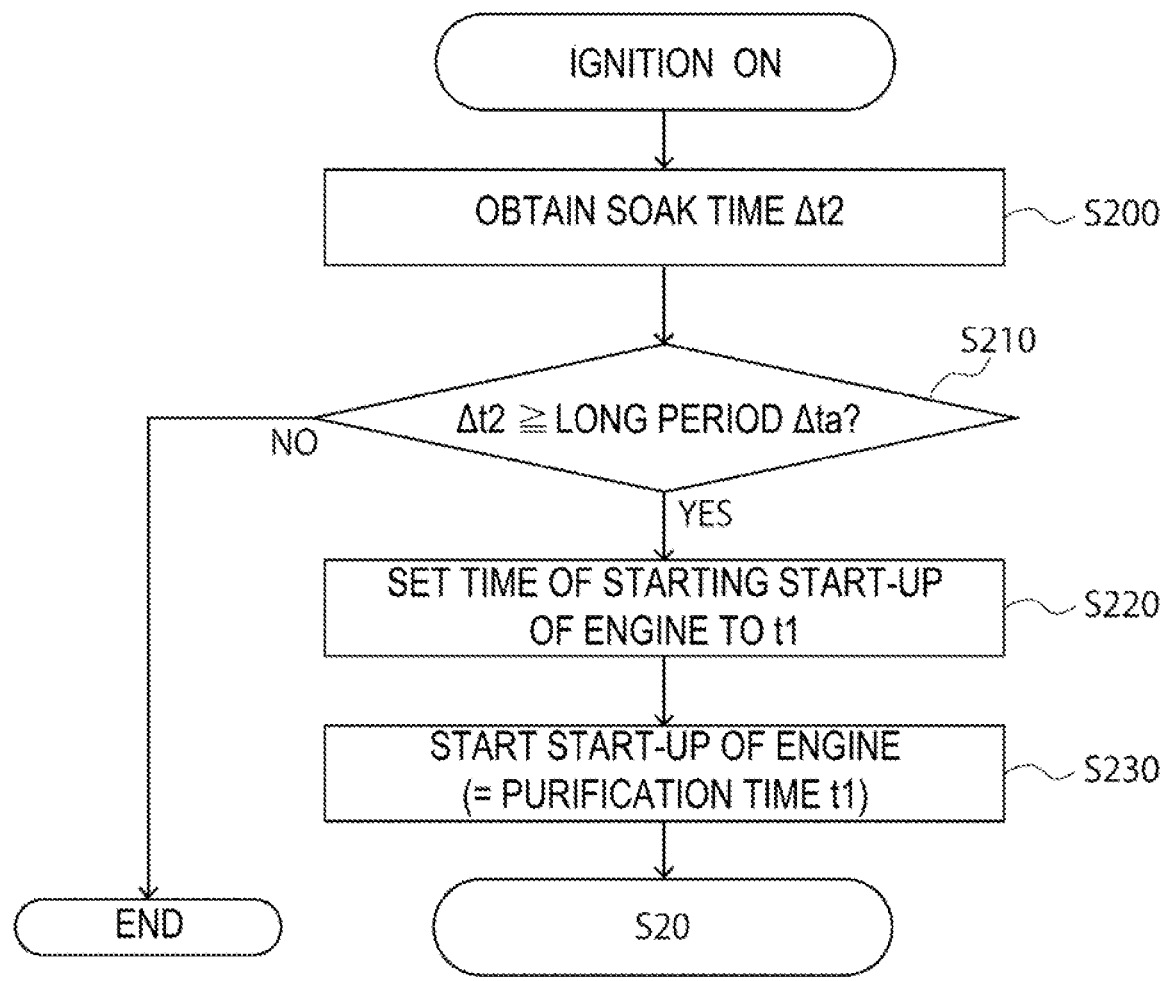
FIG. 6 is a flowchart in which a third purification time in the purification program of FIG. 3 is set.

As illustrated in FIG. 6, the DCU 52 executes step S200 to obtain the soak time Δt2 of the vehicle 60 which is obtained by the soak timer 57 provided with the DCU 52. Incidentally, the soak time is a time for which the target value is constant in a program control. In step S200, the target value is intended for the stoppage of the vehicle 60. In other words, here, the soak time Δt2 of the vehicle 60 means a time after the vehicle stops, and a time from the ignition-off to the ignition-on.

Next, the DCU 52 executes step S210 to determine whether the obtained soak time Δt2 is a long period Δta or more. In step S210, in a case where the soak time Δt2 is shorter than the long period Δta, the purification program 70 ends. On the other hand, in a case where the soak time Δt2 is the long period Δta or more, the DCU 52 executes step S220 to set a time of starting the start-up of the engine 40 to the purification time t1. Further, when the start-up of the engine 40 starts in step S230, step S20 is executed.

When the purification time t1 is set in a time when the start-up of the engine 40 starts in a case where the soak time Δt2 is the long period Δta or more, the NOx sensor 10 is purified at the time of using the vehicle 60 after the long-term storage. Thus, it is advantageous in that the effect of the moisture condensed in the reference air chamber 21 during the storage or the humidity is excluded to maintain the NOx sensor 10 in an excellent state.

In the above-described purification program 70, it is possible to cause the DCU 52 to execute the time setting procedure to set the fourth purification time t1 to a time of starting the start-up of the engine 40 after the number Nig of the ignition-on of the vehicle 60 is determined to be less than a number determination value Na set to indicate a time immediately after the production.

The number determination value Na is set as the number for determining whether it is the time immediately after the vehicle 60 is produced. For example, the number determination value Na is set to 100 times.

As illustrated in FIG. 7, the DCU 52 executes step S300 to obtain the number Nig of the ignition-on which the counter 58 provided in the DCU 52 obtains.

Next, the DCU 52 executes step S310 to determine whether the obtained number Nig of the ignition-on is less than the number determination value Na. In step S310, in a case where the number Nig of the ignition-on is the number determination value Na or more, the purification program 70 ends. On the other hand, in a case where the number Nig of the ignition-on is less than the number determination value Na, the DCU 52 executes step S320 to set a time of starting the start-up of the engine 40 as the purification time t1. Further, when the start-up of the engine 40 starts in step S330, step S20 is executed.

It is determined based on the number Nig of the ignition-on whether it is the time immediately after the vehicle 60 is produced. Thus it is advantageous in that the effect of the moisture condensed in the reference air chamber 21 at the time of use after the long-term storage immediately after the production or the humidity is excluded to maintain the NOx sensor 10 in an excellent state.

In the above-described purification program 70, it is possible to cause the DCU 52 to execute the time setting procedure to set the fifth purification time t1 at each of times of starting the start-up of the engine 40.

As illustrated in FIG. 8, when the ignition-on sensor 53 detects the ignition-on, the DCU 52 executes step S400 to set the time of starting the start-up of the engine 40 as the purification time t1. Further, when the start-up of the engine 40 starts in step S410, step S20 is executed.

In this manner, the purification of the NOx sensor 10 is performed every time of starting the start-up of the engine 40, which is advantageous in that the NOx sensor 10 is maintained in an excellent state during a long period.

Incidentally, in the third to fifth purification times t1, it is preferable that the period $\Delta t1$ of the purification control performed at the third and fourth purification times t1, and the period $\Delta t1$ of the purification control performed at the fifth purification time t1 be set as different periods. For example, the period $\Delta t1$ of the purification control performed at the third and fourth purification times t1 is set to several tens of minutes, and the period $\Delta t1$ of the purification control performed at the fifth purification time t1 is set to several minutes. Specifically, the purification control performed at the fifth purification time t1 is performed many times. Thus, when the period of the purification control performed at the fifth purification time is set to a period shorter than the period of the purification control performed at the third and fourth purification times t1 in consideration of the durability of the NOx sensor 10, it is more advantageous in terms of the improvement of the durability of the NOx sensor 10.

In the above-described purification program 70, it is possible to cause the DCU 52 to execute the time setting procedure to set the sixth purification time t1 to a light-off period $\Delta t3$ during the conduction with the heater 15 of the NOx sensor 10.

FIG. 9 is a graph illustrating a relation between the heating time t of the heater 15 and the temperature T of the sensor element 14 when the NOx sensor 10 detects the NOx concentration. Herein, a conduction starting time of the heater 15 is set to t3, a time of reaching a preheating temperature Tpre is set to t4, a time of reaching the measurement temperature Tmax is set to t5, a time which is an ending time of the light-off period $\Delta t3$ and in which a NOx value can be output by the NOx sensor 10 is set to t6, and the activation point in which the solid electrolyte body 12 is considered to be activated is set to P1.

When the sensor element 14 is heated by the heater 15, the temperature of the sensor element 14 is raised to the preheating temperature Tpre set to a temperature lower than the measurement temperature Tmax before being raised to the measurement temperature Tmax for activation. In this manner, when the temperature of the sensor element 14 is raised to the preheating temperature Tpre before being raised to the measurement temperature Tmax, the moisture which enters or adheres to the interior of the sensor element 14 is evaporated. For example, the preheating temperature is set to several tens of degrees.

The light-off period $\Delta t3$ means a period from time t4 to time t6, and a period until when the electrodes including the reference electrode 31 provided in the sensor element 14 become stable. In a case where the purification time t1 is set within the period of the light-off period $\Delta t3$, it is preferable that the purification time t1 is set between the time t4 when the light-off period $\Delta t3$ starts and the time t5 of reaching the measurement temperature Tmax. Specifically, if the purification time t1 is set before the activation of the solid electrolyte body 12, the voltage is applied in a state where the current does not flow. Thus, there is a risk that the durability of the solid electrolyte body 12 is degraded. For this reason, the activation point P1 where the solid electrolyte body 12 is considered to be activated at around the time t5 is preferably set to the purification time t1.

In this case, the purification program 70 is executed when the control unit 34 which receives dew-point information obtained from the detection value of the exhaust gas temperature sensor 59 from the DCU 52, the light-off period $\Delta t3$ is set based on the dew-point information, and the conduction of the heater 15 starts.

Figure 10:
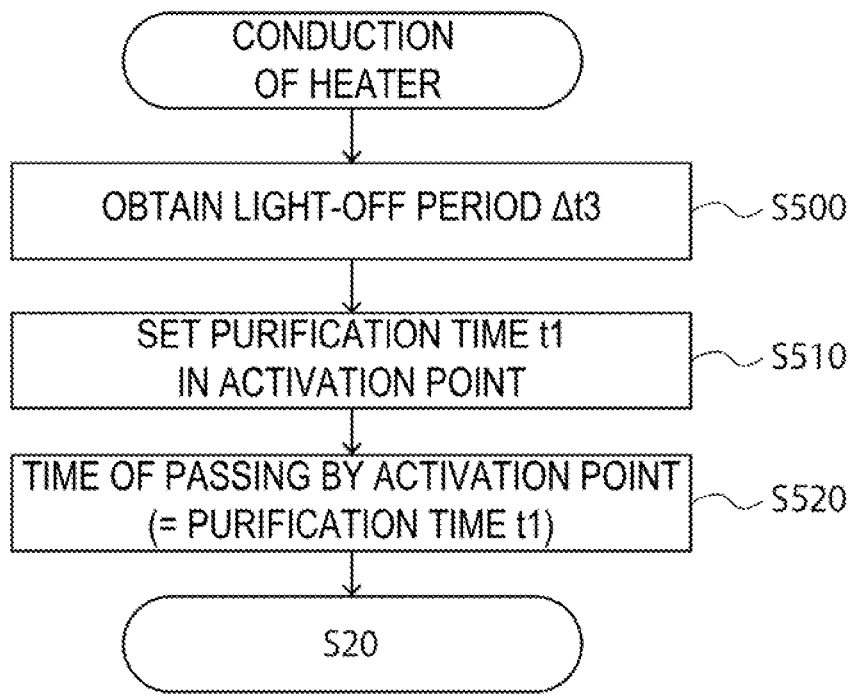
FIG. 10 is a flowchart in which a sixth purification time of the purification program of FIG. 3 is set.

As illustrated in FIG. 10, the DCU 52 executes step S500 to access the control unit 34 and to obtain the light-off period $\Delta t3$ set by the control unit 34.

Next, the DCU 52 executes step S510 to set the purification time t1 to the obtained activation point P1 of the light-off period $\Delta t3$. Further, step S20 is executed at the time of reaching the activation point P1 during the period of the light-off period $\Delta t3$ in step S520.

The purification time t1 is set within the period of the light-off period $\Delta t3$, so that the reference air chamber 21 is purified early when the oxygen concentration of the reference air chamber 21 is unstable. Thus, the early activate performance of the NOx sensor 10 which is extremely important for improvement of the exhaust gas performance can be improved without the loss of the durability.

It is preferable that the purification control starting during the period of the light-off period $\Delta t3$ is maintained for a certain period after the temperature of the sensor element 14 is raised to the measurement temperature Tmax and the NOx sensor 10 starts to detect the NOx concentration of the exhaust gas.

It is preferable that the period $\Delta t1$ of the purification control in FIG. 9 is set as a predetermined period. For example, the period $\Delta t1$ of the purification control performed at the sixth purification time t1 is about ten minutes.

In the above-described purification program 70, it is possible to cause the DCU 52 to execute the time setting procedure to set the seventh purification time t1 to a start time t7 of the post treatment control during the travel of the vehicle 60.

The post treatment control means a regeneration control of the collection device 44 and a purge control of the SCR catalyst 46. In other words, the start time t7 of the post treatment control means a start time of any one of the regeneration control of the collection device 44 and the purge control of the SCR catalyst 46.

In this case, the purification program 70 is executed at the time of start-up of the engine 40.

Figure 11:
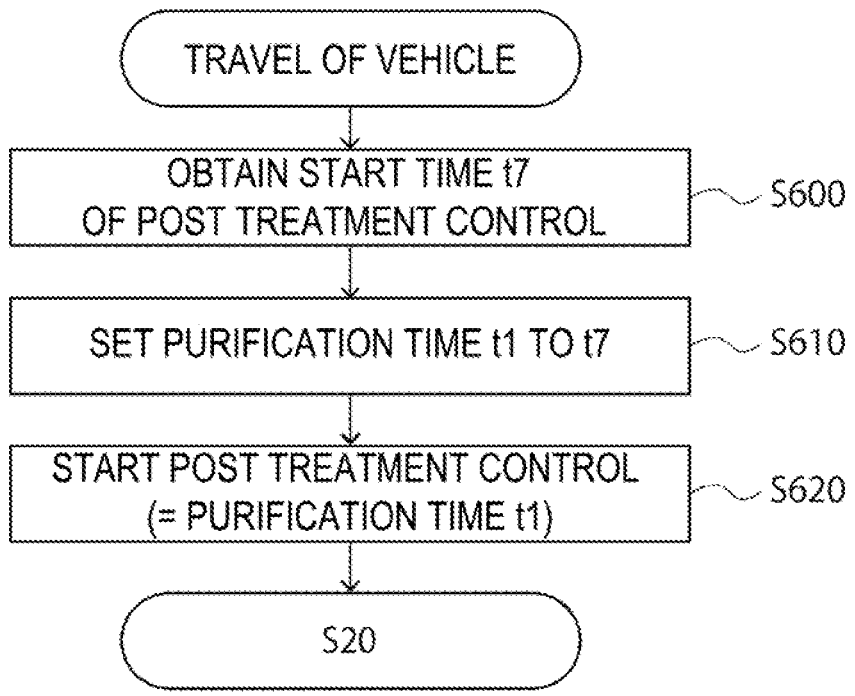
FIG. 11 is a flowchart in which a seventh purification time of the purification program of FIG. 3 is set.

As illustrated in FIG. 11, the DCU 52 executes step S600 to access the ECM 51 and obtain the start time t7 of any one of the start time of the regeneration control of the collection device 44 started based on the detection value of the differential pressure sensor 56 connected to the ECM 51 and the start time of the purge control of the SCR catalyst 46 started based on the detection value of the exhaust temperature sensor 55.

Next, the DCU 52 executes step S610 to set the purification time t1 to the obtained start time t7. Further, step S20 is executed at the time of reaching the start time t7 of the post treatment control in step S620.

The purification time t1 is set in the start time t7 of the post treatment control, and the hydrocarbon is oxidized by the reference electrode 31 to purify the reference air chamber 21 even when hydrocarbon increasing by the post treatment control goes around the reference air chamber 21. Thus, it is advantageous in that the effect of the disturbance by the post treatment control is excluded so that the NOx sensor 10 is maintained in an excellent state.

Incidentally, it is preferable that the purification control performed at the seventh purification time t1 is continued in several minutes after the post treatment control is ended.

Incidentally, it is possible that the post treatment control is applied to a rich combustion control of a NOx adsorbing reduction catalyst (LNT catalyst) which is not provided in the engine 40 of the embodiment.

REFERENCE SIGNS LIST

10 NOx sensor
14 sensor element
15 heater
21 reference air chamber
28 reference pump cell
30 second pump electrode
31 reference electrode
34 control unit
37 switch
38 reference power supply
40 engine
41 exhaust passage
42 post treatment device
50 control unit
51 ECM
52 DCU
60 vehicle
70 purification program
I3 reference pump current
I4 purification pump current
t1 purification time
ρ0 reference oxygen concentration
ρ1 purification oxygen concentration

The invention claimed is:

1. A non-transitory computer-readable medium having a NOx sensor purification instructions for a NOx sensor, which that is disposed at an exhaust passage of an internal combustion engine mounted in a vehicle, and in which configured with a reference pump cell pumping out oxygen into a reference air chamber is configured by a reference electrode which is disposed inside a sensor element in the reference air chamber communicating with outer air and a reference pump electrode disposed outside the sensor element, and which is provided with a controller which performs control to adjust a current flowing in the reference pump cell to be a predetermined reference pump current, the NOx sensor purification instructions causing:

an on-vehicle electronic computer mounted in the vehicle, when it comes to a predetermined purification time, to execute a start procedure to send a start command to perform a purification control to the controller; and the controller, in response to the start command, to execute a purification procedure to perform the purification control which causes the current flowing in the reference pump cell from the reference pump current to be a purification pump current, which is set to a pump current value larger than the predetermined reference pump current.

2. The non-transitory computer-readable medium having the NOx sensor purification instructions according to claim 1, wherein a value of the predetermined reference pump current is set to a value such that an oxygen concentration of the reference air chamber is maintained to a predetermined reference oxygen concentration, and wherein a value of the purification pump current is set to a value such that the oxygen concentration of the reference air chamber is set to a purification oxygen concentration, which is set to an oxygen concentration larger than the predetermined reference oxygen concentration.

3. The non-transitory computer-readable medium having the NOx sensor purification instructions according to claim 1, causing, while being causing the controller to execute the purification procedure, the on-vehicle electronic computer to execute:

a resistance value obtaining procedure to obtain a resistance value of the reference pump a determination procedure to determine whether the obtained resistance value is a predetermined end determining value, or more; and an ending procedure to send an ending command to control the controller to stop the purification control to the controller when the resistance value is the predetermined end determining value or more, and causing the controller to execute a stop procedure to stop the purification control according to the ending command.

4. The non-transitory computer-readable medium having the NOx sensor purification instructions according to claim 1, causing, when the vehicle is inspected, the on-vehicle electronic computer to execute:

a time setting procedure to set a time at which the on-vehicle electronic computer receives an inspection command from a vehicle exterior electronic calculator connected to the on-vehicle electronic computer, as the purification time.

5. The non-transitory computer-readable medium having the NOx sensor purification instructions according to claim 1, causing, while the vehicle is travelling the on-vehicle electronic computer to execute:

a travel distance obtaining procedure to obtain a travel distance from a travel distance sensor which is mounted in the vehicle and obtains the travel distance of the vehicle;

a travel distance determination procedure to determine whether the obtained travel distance is a purification travel distance or more; and a time setting procedure to set a time at which the travel distance is the purification travel distance or more, as the purification time.

6. The non-transitory computer-readable medium having the NOx sensor purification instructions according to claim 1, causing, when the vehicle starts up, the on-vehicle electronic computer to execute:

a soak time obtaining procedure to obtain a soak time from a soak timer which is mounted in the vehicle and obtains the soak time of the vehicle;

a soak time determination procedure to determine whether the obtained soak time is a predetermined long period, or more, and a time setting procedure to set a time at which the internal combustion engine starts up in a case where the soak time is determined to be the predetermined long period or more, as the purification time.

7. The non-transitory computer-readable medium having the NOx sensor purification instructions according to claim 1, causing, when the vehicle starts up, the on-vehicle electronic computer to execute:

a conducting number obtaining procedure to obtain the number of times of the conducting from a conducting counter which is mounted in the vehicle and obtains the number of times that a high-voltage circuit is conducted, a conducting number determination procedure to determine whether the obtained number of times of the conducting is less than a predetermined number determination value, and a time setting procedure to set a time at which the internal combustion engine starts up in a case where the obtained number of times of the conducting is less than the predetermined number determination value, as the purification time.

8. The non-transitory computer-readable medium having the NOx sensor purification instructions according to claim 1, causing the on-vehicle electronic computer to execute a time setting procedure to set a time at which the internal combustion engine starts up, as the purification time.

9. The non-transitory computer-readable medium having the NOx sensor purification instructions according to claim 1, wherein the NOx sensor includes an electrothermal heater which heats the sensor element, and wherein the NOx sensor purification instructions causes when the heater starts to heat the sensor element, the on-vehicle electronic computer to execute:

a light-off period obtaining procedure to obtain a light-off period for which the controller performs control to supply power to the heater to raise a temperature of the sensor element to a predetermined measurement temperature; and a time setting procedure to set the purification time within the obtained light-off period.

10. The non-transitory computer-readable medium having the NOx sensor purification instructions according to claim 1, causing, while the vehicle is traveling, the on-vehicle electronic computer to execute:

a post treatment time obtaining procedure to obtain a start time of a post treatment control of any one of a regeneration control of a particulate-substance collecting device disposed in the exhaust passage, a purge control of a selective reduction catalyst, and a rich combustion control of a NOx adsorption reduction catalyst, and a time setting procedure to set the obtained start time as the purification time.

11. An internal combustion engine, comprising:

an on-vehicle electronic computer in which the NOx sensor purification instructions according to claim 1 is stored.

12. A NOx sensor purification method comprising:

adjusting a current flowing in a reference pump cell, which is configured by a reference electrode disposed in a reference air chamber communicating outer air inside a sensor element and a pump electrode disposed on an outside of the sensor element, to be a predetermined reference pump current; and maintaining an oxygen concentration of the reference air chamber to a predetermined reference oxygen concentration, causing, when it comes to a predetermined purification time, the current flowing in the reference pump cell to be a purification pump current, which is set to a current value larger than the predetermined reference pump current, and an oxygen concentration of the reference air chamber to be a purification oxygen concentration, which is set to an oxygen concentration larger than the predetermined reference oxygen concentration.

\* \* \* \* \*